United States Patent
Jain (10) Patent No.: US 9,152,948 B2
(45) Date of Patent: Oct. 6, 2015

(54) METHOD AND SYSTEM FOR PROVIDING A STRUCTURED TOPIC DRIFT FOR A DISPLAYED SET OF USER COMMENTS ON AN ARTICLE

(75) Inventor: Vidit Jain, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 850 days.

(21) Appl. No.: 13/400,125

(22) Filed: Feb. 20, 2012

(65) Prior Publication Data

US 2013/0218960 A1     Aug. 22, 2013

(51) Int. Cl.
   *G06F 15/16* (2006.01)
   *G06Q 10/10* (2012.01)
   *G06F 17/30* (2006.01)
   *H04N 21/262* (2011.01)

(52) U.S. Cl.
   CPC .......... *G06Q 10/10* (2013.01); *G06F 17/30896* (2013.01); *H04N 21/262* (2013.01)

(58) Field of Classification Search
   CPC . G06Q 10/10; H04N 21/262; G06F 17/30896
   USPC ............................ 709/202–207; 715/853–855
   See application file for complete search history.

(56) References Cited

U.S. PATENT DOCUMENTS

| | | | |
|---|---|---|---|
| 6,629,087 B1* | 9/2003 | Benson et al. | 706/11 |
| 2006/0293909 A1* | 12/2006 | Miyajima et al. | 705/1 |
| 2008/0109762 A1* | 5/2008 | Hundal et al. | 715/855 |
| 2009/0240564 A1* | 9/2009 | Boerries et al. | 709/204 |
| 2011/0093794 A1* | 4/2011 | Grace | 709/206 |

* cited by examiner

*Primary Examiner* — Bharat N Barot
(74) *Attorney, Agent, or Firm* — Brinks Gilson & Lione (57) ABSTRACT

A method and system for providing a structured topic drift for a displayed set of user comments on an article. The method includes determining an ordered sequence of topical recommendations based on one or more properties of the displayed set of user comments and user characteristics using a sequential recommendation model. The method also includes sampling one or more user comments for each of the topical recommendations. Further, the method includes appending, one by one, the one or more user comments for each of the topical recommendations to bottom of the displayed set of user comments. Moreover, the method includes updating the sequential recommendation model based on a user response to the one or more user comments for each of the topical recommendations. The system includes one or more electronic devices, a communication interface, a memory, and a processor.

21 Claims, 4 Drawing Sheets

METHOD AND SYSTEM FOR PROVIDING A STRUCTURED TOPIC DRIFT FOR A DISPLAYED SET OF USER COMMENTS ON AN ARTICLE

TECHNICAL FIELD

Embodiments of the disclosure relate to the field of providing a structured topic drift for a displayed set of user comments on an article.

BACKGROUND

Currently, there are multiple websites which enable users to post comments in response to an article or an existing comment, with an objective of voicing opinions or participating in a conversation. The comments are many in number and are associated with a single topic, for example a person, a place, an event, or an organization. A user, when reading such comments, can hence easily get disinterested in the topic. The user can further leave a network which results in a loss of revenue.

In the light of the foregoing discussion, there is a need for a method and system for an efficient technique to provide a structured topic drift for a displayed set of user comments on an article.

SUMMARY

The above-mentioned needs are met by a method, a computer program product and a system for providing a structured topic drift for a displayed set of user comments on an article.

An example of a method of providing a structured topic drift for a displayed set of user comments on an article includes determining an ordered sequence of topical recommendations based on one or more properties of the displayed set of user comments and user characteristics using a sequential recommendation model. The method also includes sampling one or more user comments for each of the topical recommendations. Further, the method includes appending, one by one, the one or more user comments for each of the topical recommendations to bottom of the displayed set of user comments. Moreover, the method includes updating the sequential recommendation model based on a user response to the one or more user comments for each of the topical recommendations.

An example of a computer program product stored on a non-transitory computer-readable medium that when executed by a processor, performs a method of providing a structured topic drift for a displayed set of user comments on an article includes determining an ordered sequence of topical recommendations based on one or more properties of the displayed set of user comments and user characteristics using a sequential recommendation model. The computer program product also includes sampling one or more user comments for each of the topical recommendations. Further, the computer program product includes appending, one by one, the one or more user comments for each of the topical recommendations to bottom of the displayed set of user comments. Moreover, the computer program product includes updating the sequential recommendation model based on a user response to the one or more user comments for each of the topical recommendations An example of a system for providing a structured topic drift for a displayed set of user comments on an article includes one or more electronic devices. The system also includes a communication interface in electronic communication with the one or more electronic devices. The system further includes a memory that stores instructions. Further, the system includes a processor responsive to the instructions to determine an ordered sequence of topical recommendations based on one or more properties of the displayed set of user comments and user characteristics using a sequential recommendation model, to sample one or more user comments for each of the topical recommendations, to append, one by one, the one or more user comments for each of the topical recommendations to bottom of the displayed set of user comments, and to update the sequential recommendation model based on a user response to the one or more user comments for each of the topical recommendations.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for providing a structured topic drift for a displayed set of user comments on an article. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
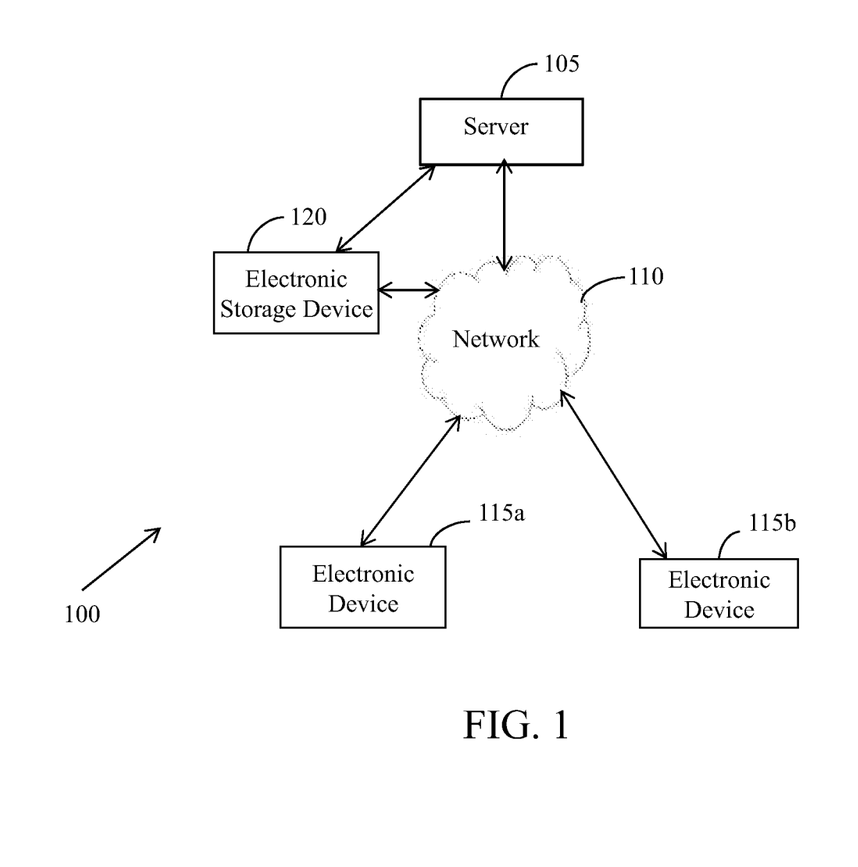
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 further includes one or more electronic devices, for example an electronic device 115a and an electronic device 115b, which can communicate with each other through the network 110. Examples of the electronic devices include, but are not limited to, computers, mobile devices, laptops, palmtops, hand held devices, telecommunication devices, and personal digital assistants (PDAs).

The electronic devices can communicate with the server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic devices associated with different users can be remotely located with respect to the server 105.

The server 105 is also connected to an electronic storage device 120 directly or via the network 110 to store information, for example properties of the displayed set of user comments and the user characteristics, and the one or more user comments for each of the topical recommendations.

In some embodiments, different electronic storage devices are used for storing the information.

A user of an electronic device, for example the electronic device 115a, views a displayed set of user comments on an article on a web page. The server 105, for example a Yahoo!® server, determines an ordered sequence of topical recommendations based on one or more properties of the displayed set of user comments and user characteristics using a sequential recommendation model. The properties of the displayed set of user comments and the user characteristics are stored in the electronic storage device 120. The server 105 samples one or more user comments for each of the topical recommendations, also stored in the electronic storage device 120. The user comments for each of the topical recommendations are appended, one by one, to bottom of the displayed set of user comments. The user can view the user comments for each of the topical recommendations. The server 105 further updates the sequential recommendation model based on a user response to the one or more user comments for each of the topical recommendations.

Figure 2:
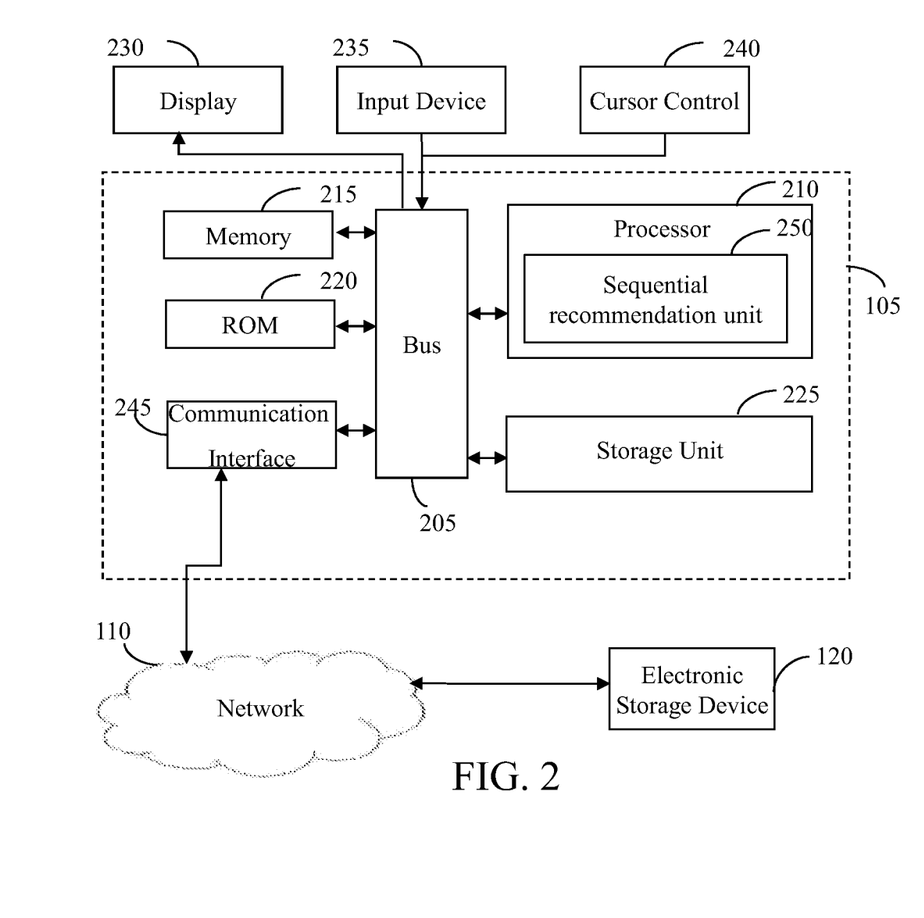
FIG. 2 is a block diagram of a server, in accordance with one embodiment.

The server 105 including a plurality of elements is explained in detail in conjunction with FIG. 2.

FIG. 2 is a block diagram of the server 105, in accordance with one embodiment.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example the user response and a plurality of user comments.

The server 105 can be coupled via the bus 205 to a display 230, for example a cathode ray tube (CRT), and liquid crystal display (LCD) for displaying the one or more user comments for each of the topical recommendations. An input device 235, including alphanumeric and other keys, is coupled to the bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the server 105 for implementing the techniques described herein. In some embodiments, the techniques are performed by the server 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units, for example a sequential recommendation unit 250, for performing one or more functions of the processor 210. The sequential recommendation unit 250 can determine an ordered sequence of topical recommendations based on one or more properties of the displayed set of user comments and user characteristics using a sequential recommendation model. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

The server 105 is also connected to the electronic storage device 120 to store the properties of the displayed set of user comments and the user characteristics, and the one or more user comments for each of the topical recommendations.

The processor 210 in the server 105, for example a Yahoo!® server, includes the sequential recommendation unit 250. When the displayed set of user comments on an article is being viewed by a user on a web page, the sequential recommendation unit 250 determines an ordered sequence of topical recommendations based on one or more properties of the displayed set of user comments and user characteristics using a sequential recommendation model. The processor 210 samples one or more user comments for each of the topical recommendations, also stored in the electronic storage device 120. The user comments for each of the topical recommendations are appended, one by one, to bottom of the displayed set of user comments. The user can view the user comments for each of the topical recommendations via the display 230. The processor 210 further updates the sequential recommendation model based on a user response to the one or more user comments for each of the topical recommendations.

Figure 3:
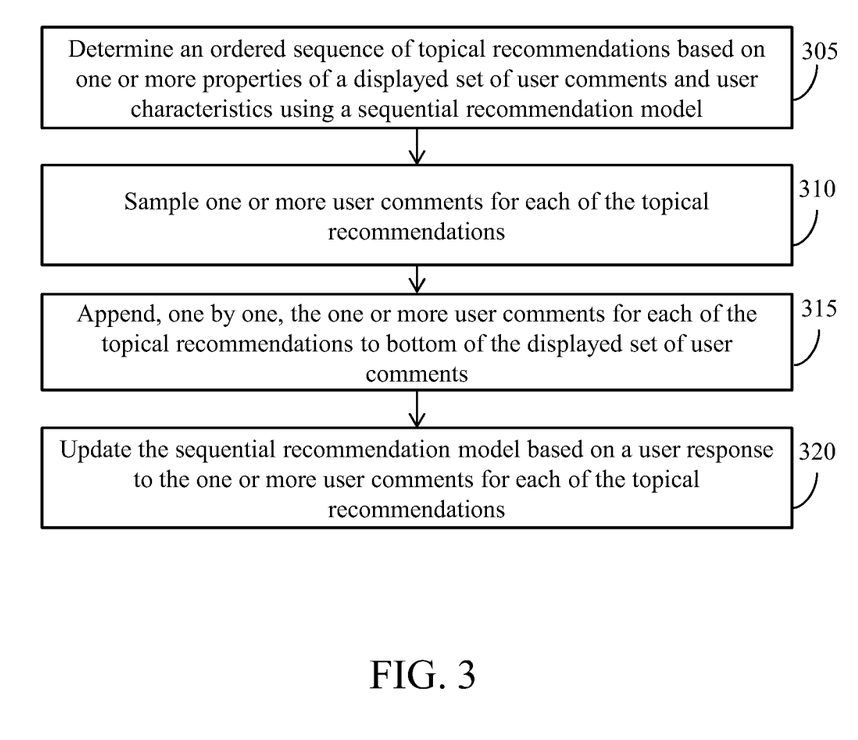
FIG. 3 is a flowchart illustrating a method of providing a structured topic drift for a displayed set of user comments on an article, in accordance with one embodiment.

FIG. 3 is a flowchart illustrating a method of providing a structured topic drift for a displayed set of user comments on an article, in accordance with one embodiment. The displayed set of user comments can include a cluster of user comments posted in response to the article. The displayed set of user comments is associated with a topic.

The displayed set of user comments on the article is viewed by a user. An ordered sequence of topical recommendations is then determined, at step 305, based on one or more properties of the displayed set of user comments and user characteristics. Examples of the one or more properties of the displayed set of user comments include, but are not limited to, discussed entities and article domain. Examples of the one or more properties of the user characteristics include, but are not limited to, user preferences and geographical information.

A sequential recommendation model is used to determine the ordered sequence of topical recommendations by a sequential recommendation unit, for example the sequential recommendation unit 250. In one example, the sequential recommendation model used is a Kalman filter based model. A prediction function is used to determine one or more features in the Kalman filter based model. The Kalman filter based model is used to the features into a linear dynamic system. Examples of the features include, but are not limited to, an effortless topic transition, relevance to the displayed set of user comments, and also the structured topic drift.

The Kalman filter based model determines an internal state (S) and noisy observations (X). The internal state can refer to current information need of the user or user interest. The noisy observations refer to certain measures, for example time spent on individual user comments, the user preferences and the geographical information. A next internal state ($S_{t+1}$) can be determined using equation (1) as given below:

$$S_{t+1} = F_{t+1} \cdot S_t + G_{t+1} \cdot X_t + H_{t+1} \quad (1)$$

where $F_{t+1}$ represents a state transition model, $G_{t+1}$ represents a function that correlates user observation to a model state, and $H_{t+1}$ represents a noise model.

At step 310, one or more user comments for each of the topical recommendations are sampled. The user comments for one topical recommendation belong to a single comment cluster. In some embodiments, the topical recommendations are either related to the article or unrelated to the article. The topical recommendations can also be associated with different topics. The user comments for each of the topical recommendations are sampled according to a ranking based on content, recency, or popularity. In one example, highest ranking user comments are sampled from a plurality of user comments for a particular topical recommendation. The user comments can also vary in number for each of the topical recommendations during sampling. In some embodiments, the number of the user comments that need to be sampled can be determined using one or more parameters by a machine learned algorithm. Examples of the parameters include, but are not limited to, the user preferences, user history, user behavior in a current session, and past trends on a determined topic.

In some embodiments, the user comments for each of the topical recommendations are ranked using a ranking algorithm.

In some embodiments, the parameters can be stored in an electronic storage device, for example the electronic storage device 120.

At step 315, the user comments for each of the topical recommendations are appended, one by one, to bottom of the displayed set of user comments. The user can then view the displayed set of user comments along with the user comments for each of the topical recommendations.

In some embodiments, the user desires to view a plurality of user comments similar to the displayed set of user comments or similar to the user comments for one or more of the topical recommendations. An option, for example similar user comments, is hence provided to the user at bottom of the displayed set of user comments, and at bottom of each comment cluster associated with the topical recommendations. The user needs to provide a user action, for example a mouse click on the option, in order to view similar user comments.

In some embodiments, the similar user comments is stored in and retrieved from a storage unit, for example the storage unit 225, in a server, for example the server 105. In one example, the server can be a centralized server or a distributed server of Yahoo!®.

At step 320, the sequential recommendation model is updated based on a user response to the user comments for each of the topical recommendations. Examples of the user response include, but are not limited to, time spent, rating and reply actions. The user can then view an updated version of the user comments.

In some embodiments, user comments or the comment cluster associated with a first topical recommendation is first appended to the displayed set of user comments. The user subsequently views the user comments associated with the first topical recommendation. Based on the user response to the user comments associated with the first topical recommendation, the sequential recommendation model is updated and user comments associated with a second topical recommendation is appended and displayed to the user. Such a process is repeated for subsequent topical recommendations.

In some embodiments, the method steps 305 to 320 are repeated once the sequential recommendation model is updated based on the user response to one or more of the user comments for each of the topical recommendations.

In some embodiments, the user comments are displayed in extensible markup language (XML) format or in hypertext markup language (HTML) format.

Figure 4:
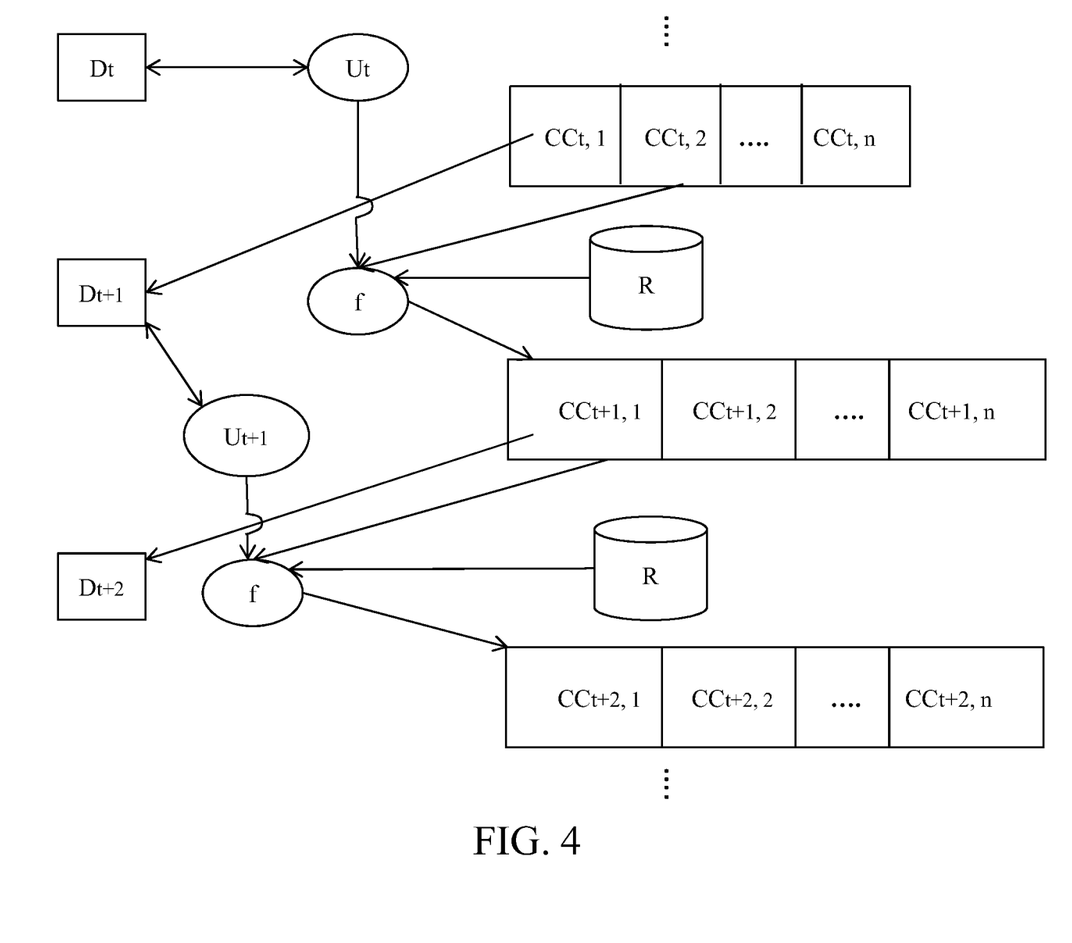
FIG. 4 is a block diagram illustrating working of a sequential recommendation model, in accordance with one embodiment.

FIG. 4 is a block diagram illustrating working of a sequential recommendation model, in accordance with one embodiment. The user views a displayed set of user comments at time t, represented as Dt. Based on user interaction Ut, for example time spent, with the displayed set of user comments Dt, one or more comment clusters, represented as $CC_{t,\,1}$ to $CC_{t,\,n}$, for a first topical recommendation are sampled and appended to Dt. One comment cluster that is appended to the displayed set of user comments at time (t+1), represented as $D_{t+1}$, is subsequently displayed to the user at time (t+1). The comment clusters $CC_{t,\,1}$ to $CC_{t,\,n}$ for the first topical recommendation are captured along with the user interaction Ut by the sequential recommendation model f to update its internal state. The sequential recommendation model f then retrieves, from a repository R or an electronic storage device, one or more comment clusters, represented as $CC_{t+1,\,1}$ to $CC_{t+1,\,n}$, for a second topical recommendation. The comment clusters $CC_{t+1,\,1}$ to $CC_{t+1,\,n}$ are sampled and appended to $D_{t+1}$. One comment cluster that is appended to the displayed set of user comments at time (t+2), represented as $D_{t+2}$, is subsequently displayed to the user at time (t+2). The comment clusters $CC_{t+1,\,1}$ to $CC_{t+1,\,n}$ for the second topical recommendation are captured along with user interaction $U_{t+1}$ by the sequential recommendation model f to update its internal state. The sequential recommendation model f then retrieves, from the repository R or the electronic storage device, one or more comment clusters, represented as $CC_{t+2,\,1}$ to $CC_{t2,\,n}$, for a third topical recommendation. Such a process is repeated for an ordered sequence of topical recommendations.

The present disclosure provides a structured and controlled topic drift for a displayed set of user comments on an article by determining an ordered sequence of topical recommendations using a sequential recommendation model. The present disclosure enables a user to maintain interest in the displayed set of user comments as the topical recommendations provided are on similar topics and not on a single topic. Hence, the user remains engaged on a webpage that includes a related article. The user thereby spends an increased amount of time on Yahoo!® websites, for example Yahoo! News, Yahoo! Mobile News, Yahoo! Finance, and Yahoo! Sports, or other websites. The method and system in the present disclosure can be used across websites that allow the user to read the user comments on an article.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method of providing a structured topic drift for a displayed set of user comments on an article, the method comprising:
    determining, using at least one processor, an ordered sequence of topical recommendations based on one or more properties of the displayed set of user comments and user characteristics using a sequential recommendation model, wherein each topical recommendation contains a plurality of user comments;
    sampling, using the at least one processor, each of the topical recommendations in the ordered sequence to produce a first set of one or more user comments for each of the topical recommendations;
    appending, using the at least one processor, one by one, the user comments from the first set of one or more user comments for each of the topical recommendations to bottom of the displayed set of user comments; and
    updating, using the at least one processor, the sequential recommendation model based on a user response to the first set of one or more user comments for each of the topical recommendations;
    determining, using at least one processor, a second ordered sequence of topical recommendations using the sequential recommendation model;
    sampling, using the at least one processor, each of the topical recommendations in the second ordered sequence to produce a second set of one or more user comments for each of the topical recommendations; and
    appending, using the at least one processor, one by one, the second set of one or more user comments for each of the topical recommendations to bottom of the displayed set of user comments.

2. The method as claimed in claim 1, wherein the displayed set of user comments is associated with a topic.

3. The method as claimed in claim 1, wherein determining the ordered sequence of topical recommendations further comprises
    determining one or more features associated with the structured topic drift using a prediction function in the sequential recommendation model;
    determining, using the sequential recommendation model, an initial internal state based on the one or more features, wherein the initial internal state is related to the user characteristics and is used to determine the ordered sequence of topical recommendations.

4. The method as claimed in claim 3, wherein updating the sequential recommendation model based on the user response comprises
receiving a set of noisy observation input data, and determining, using the sequential recommendation model, a next internal state based on the noisy observation input data; and
wherein the next internal state is used to determine the second ordered sequence of topical recommendations.

5. The method as claimed in claim 3, wherein the features associated with the structured topic drift comprise at least one of an effortless topic transition, a relevance to the displayed set of user comments to the user preferences, and a current determination of the structured topic drift.

6. The method as claimed in claim 1, wherein the one or more user comments for each of the topical recommendations are sampled based on a ranking.

7. The method as claimed in claim 4, wherein the noisy observation input data comprises at least one of a time spent viewing an individual user comments, a set of user preferences related to the user, or geographical information related to the user.

8. The method as claimed in claim 1 and further comprising
providing an option to a user to view a plurality of user comments similar to one or more of the displayed set of user comments and the one or more user comments for each of the topical recommendations.

9. A computer program product stored on a non-transitory computer-readable medium that when executed by a processor, performs a method of providing a structured topic drift for a displayed set of user comments on an article, comprising:
determining an ordered sequence of topical recommendations based on one or more properties of the displayed set of user comments and user characteristics using a sequential recommendation model;
sampling one or more user comments for a plurality of the topical recommendations in the ordered sequence to produce a set of one or more user comments;
appending, one by one, the one or more user comments for each of the topical recommendations to bottom of the displayed set of user comments; and
updating the sequential recommendation model based on a user response to the one or more user comments for each of the topical recommendations;
determining a second ordered sequence of topical recommendations using the sequential recommendation model;
sampling one or more user comments for a plurality of the topical recommendations in the second ordered sequence to produce a second set of one or more user comments; and
appending, one by one, the second set of one or more user comments for each of the topical recommendations to bottom of the displayed set of user comments.

10. The computer program product as claimed in claim 9, wherein the displayed set of user comments is associated with a topic.

11. The computer program product as claimed in claim 9, wherein determining the ordered sequence of topical recommendations comprises
determining one or more features associated with the structured topic drift using a prediction function in the sequential recommendation model;
determining, using the sequential recommendation model, an initial internal state based on the one or more features, wherein the initial internal state is used to determine the ordered sequence of topical recommendations.

12. The computer program product as claimed in claim 9, wherein updating the sequential recommendation model based on the user response comprises
receiving a set of noisy observation input data, and determining, using the sequential recommendation model, a next internal state based on the noisy observation input data; and
wherein the next internal state is used to determine the second ordered sequence of topical recommendations.

13. The computer program product as claimed in claim 9, wherein the topical recommendations are associated with different topics.

14. The computer program product as claimed in claim 9, wherein the one or more user comments for each of the topical recommendations are sampled based on a ranking.

15. The computer program product as claimed in claim 9, wherein the one or more user comments for each of the topical recommendations vary in number.

16. The computer program product as claimed in claim 9 and further comprising
providing an option to a user to view a plurality of user comments similar to one or more of the displayed set of user comments and the one or more user comments for each of the topical recommendations.

17. A system for providing a structured topic drift for a displayed set of user comments on an article, the system comprising:
one or more electronic devices;
a communication interface in electronic communication with the one or more electronic devices; a memory that stores instructions; and
a processor responsive to the instructions to
determine an ordered sequence of topical recommendations based on one or more properties of the displayed set of user comments and user characteristics using a sequential recommendation model;
sample one or more user comments for each of the topical recommendations to produce a set of one or more user comments for each of the topical recommendations;
append the one or more user comments for each of the topical recommendations to the displayed set of user comments; and
update the sequential recommendation model based on a user response to the one or more user comments for each of the topical recommendations.

18. The system as claimed in claim 17 and further comprising
an electronic storage device that stores the properties of the displayed set of user comments and the user characteristics, and the one or more user comments for each of the topical recommendations.

19. The system as claimed in claim 17, wherein the processor is further responsive to the instructions to
determine a second ordered sequence of topical recommendations using the sequential recommendation model;
sample each of the topical recommendations in the second ordered sequence to produce a second set of one or more user comments for each of the topical recommendations; and append the second set of one or more user comments for each of the topical recommendations to the displayed set of user comments.

20. The system as claimed in claim 17, wherein the processor is further responsive to instructions to
   determine one or more features associated with the structured topic drift using a prediction function in the sequential recommendation model;
   determine, using the sequential recommendation model, an initial internal state based on the one or more features, wherein the initial internal state is used to determine the ordered sequence of topical recommendations.

21. The system as claimed in claim 19, wherein the processor is further responsive to instructions to
   receive a set of noisy observation input data and determine, using the sequential recommendation model, a next internal state based on the noisy observation input data; and
   wherein the next internal state is used to determine the second ordered sequence of topical recommendations.

* * * * *